United States Patent
Dell'Amico et al.

(10) Patent No.: US 10,574,700 B1
(45) Date of Patent: Feb. 25, 2020

(54) SYSTEMS AND METHODS FOR MANAGING COMPUTER SECURITY OF CLIENT COMPUTING MACHINES

(71) Applicant: Symantec Corporation, Mountain View, CA (US)

(72) Inventors: Matteo Dell'Amico, Valbonne (FR); Kevin Roundy, Culver City, CA (US); Chris Gates, Culver City, CA (US); Michael Hart, Farmington, CT (US)

(73) Assignee: Symantec Corporation, Mountain View, CA (US)

( * ) Notice: Subject to any disclaimer, the term of this patent is extended or adjusted under 35 U.S.C. 154(b) by 167 days.

(21) Appl. No.: 15/281,130

(22) Filed: Sep. 30, 2016

(51) Int. Cl.
*H04L 29/06* (2006.01)
*H04L 12/24* (2006.01)

(52) U.S. Cl.
CPC .............. *H04L 63/20* (2013.01); *H04L 41/28* (2013.01); *H04L 63/1416* (2013.01); *H04L 63/1425* (2013.01); *H04L 63/1441* (2013.01)

(58) Field of Classification Search
CPC ..... H04L 63/20; H04L 41/28; H04L 63/1441; H04L 63/1425
USPC ..................................................... 726/22–25
See application file for complete search history.

(56) References Cited

U.S. PATENT DOCUMENTS

| | | | | |
|---|---|---|---|---|
| 7,809,670 B2* | 10/2010 | Lee | ....................... | G06F 21/564 706/59 |
| 7,971,251 B2* | 6/2011 | Sinha | .................. | H04L 63/1408 455/410 |
| 2009/0249483 A1* | 10/2009 | Leibunguth | ........... | H04L 63/145 726/22 |
| 2011/0055921 A1* | 3/2011 | Narayanaswamy | ......................... | H04L 63/1458 726/22 |
| 2015/0135325 A1* | 5/2015 | Stevens | ............... | H04L 63/1416 726/25 |
| 2015/0180894 A1* | 6/2015 | Sadovsky | ............. | G06F 3/0481 726/22 |

(Continued)

OTHER PUBLICATIONS

Xavier et al., "A comparative analysis of dissimilarity measures for clustering categorical data," The 2013 International Joint Conference on Neural Networks (IJCNN) Year: 2013 | Conference Paper | Publisher: IEEE.*

(Continued)

*Primary Examiner* — Roderick Tolentino
(74) *Attorney, Agent, or Firm* — FisherBroyles, LLP

(57) ABSTRACT

A computer-implemented method for managing computer security of client computing machines may include (i) monitoring a set of client computing devices, (ii) receiving security data on sets of security-related events from each client computing device in the set of client computing devices, (iii) clustering the sets of security-related events by calculating a dissimilarity value, for each set of security-related events, that indicates a uniqueness of the set of security-related events in relation to other sets of security-related events using a dissimilarity function and adjusting the dissimilarity function based on a homogeneity of clusters of sets of security-related events, (iv) determining, based on clustering the sets of security-related events by the dissimilarity value, that a set of security-related events comprises an anomaly, and (v) performing a security action in response to determining that the set of security-related events comprises the anomaly. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2015/0310195 | A1* | 10/2015 | Bailor | G06F 21/316 726/6 |
| 2015/0324581 | A1* | 11/2015 | Singla | G06F 11/32 726/22 |
| 2015/0341379 | A1* | 11/2015 | Lefebvre | H04L 63/1425 726/22 |
| 2015/0381646 | A1* | 12/2015 | Lin | H04L 63/1416 726/23 |
| 2016/0203316 | A1* | 7/2016 | Mace | G06F 21/55 726/23 |

OTHER PUBLICATIONS

Murty et al., "Exploring the Similarity/Dissimilarity measures for unsupervised IDS," 2016 International Conference on Data Mining and Advanced Computing (SAPIENCE) Year: 2016 | Conference Paper | Publisher: IEEE.*

Tamersoy et al., Guilt by Association: Large Scale Malware Detrection by Mining File-relation Graphs; Aug. 2014.

Lulli et al., Scalable k-NN based text clustering; Oct. 2015.

Fowlkes et al., Spectral Grouping Using the Nystrom Method; Feb. 1, 2004.

Julisch et al.; Mining Intrusion Detection Alarms for Actionable Knowledge; Jul. 2002.

Jaccard index; https://en.wikipedia.org/wiki/Jaccard_index, last retrieved Sep. 19, 2016; Dec. 15, 2005.

Brian Schlatter, et al; Systems and Methods for Responding to Electronic Security Incidents; U.S. Appl. No. 15/265,346, filed Sep. 14, 2016.

Using Data Science Techniques for the Automatic Clustering of it Alertshttps://blog.pivotal.io/data-science-pivotal/products/using-data-science-techniques-for-the-automatic-clustering-of-it-alerts; Jun. 5, 2014.

SecBI; http://www.secbi.com/product/; As accessed on Aug. 11, 2016.

* cited by examiner

SYSTEMS AND METHODS FOR MANAGING COMPUTER SECURITY OF CLIENT COMPUTING MACHINES

BACKGROUND

Managed security services (MSS) are able to provide a number of client machines with network security solutions based on the needs of the organization or network. To help manage client machines, an MSS provider may collect data on security events and analyze these events to understand how they correspond to a security incident. For example, multiple security-related events that happen on a machine within a single day may point to a malware infection on that machine.

Traditionally, MSS providers may group events into sets in order to identify specific incidents that require monitoring or remediation. However, there may be an overabundance of security-related data, which may be difficult for a client to understand. For example, an organization with a large number of devices may have many security incidents, and presenting information about each incident could cause information overload for users without providing useful context about the state of security for the organization. Furthermore, incidents are often categorized using predetermined metrics, such as a rule-based approach. In some cases, new security issues may not fall under these existing categories, and incidents may not be accurately classified. Therefore, a better method of examining security events is needed in order to understand the security behaviors of client systems. Accordingly, the instant disclosure identifies and addresses a need for additional and improved systems and methods for managing computer security of client computing machines.

SUMMARY

As will be described in greater detail below, the instant disclosure describes various systems and methods for managing computer security of client computing machines. In one example, a computer-implemented method for managing computer security of client computing machines may include (i) monitoring a set of client computing devices, (ii) receiving, by a computing device, security data on sets of security-related events from each client computing device in the set of client computing devices, (iii) clustering the sets of security-related events by calculating a dissimilarity value, for each set of security-related events, that indicates a uniqueness of the set of security-related events in relation to other sets of security-related events using a dissimilarity function and adjusting the dissimilarity function based on a homogeneity of clusters of sets of security-related events, (iv) determining, based on clustering the sets of security-related events by the dissimilarity value, that a set of security-related events comprises an anomaly, and (v) performing a security action in response to determining that the set of security-related events comprises the anomaly.

In some embodiments, the security data may include a malware report, a vulnerability scan, a report of an attack, and/or a report of an attempted attack. Additionally or alternatively, the security data may include data on a response to a security-related event.

In some examples, the sets of security-related events may include security-related events grouped by a timing of occurrence.

In one embodiment, calculating the dissimilarity value may include weighting each security-related event based on an attribute of the security-related event and calculating a total value for the set of security-related events. In this embodiment, the attribute of the security-related event may include an inverse of a frequency of the security-related event in the security data, a response to the security-related event, a type of the security-related event, a timing of the security-related event, and/or a description of the security-related event.

In some examples, adjusting the dissimilarity function may include revising an algorithm to calculate the dissimilarity value of the set of security-related events such that the set of security-related events is more homogeneous with its cluster than with other clusters.

In some embodiments, performing the security action may include creating at least one new security rule for the anomaly. Additionally or alternatively, performing the security action may include alerting an administrator about the anomaly and/or alerting a client user about the anomaly.

In some examples, the computer-implemented method may further include determining that other sets of security-related events within a cluster of the anomaly is anomalous. Additionally, the computer-implemented method may further include performing the security action on the other sets of security-related events.

In one example, the computer-implemented method may further include extracting target clusters of sets of security-related events for a target client computing device. Additionally, the computer-implemented method may further include sending the target clusters to the target client computing device.

In one embodiment, a system for implementing the above-described method may include (i) a monitoring module, stored in memory, that monitors a set of client computing devices, (ii) a reception module, stored in memory, that receives, by a computing device, security data on sets of security-related events from each client computing device in the set of client computing devices, (iii) a clustering module, stored in memory, that clusters the sets of security-related events by calculating a dissimilarity value, for each set of security-related events, that indicates a uniqueness of the set of security-related events in relation to other sets of security-related events using a dissimilarity function and adjusting the dissimilarity function based on a homogeneity of clusters of sets of security-related events, (iv) a determination module, stored in memory, that determines, based on clustering the sets of security-related events by the dissimilarity value, that a set of security-related events comprises an anomaly, and (v) a performance module, stored in memory, that performs a security action in response to determining that the set of security-related events comprises the anomaly. In addition, the system may include at least one processor that executes the monitoring module, the reception module, the clustering module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor a set of client computing devices, (ii) receive, by the computing device, security data on sets of security-related events from each client computing device in the set of client computing devices, (iii) cluster the sets of security-related events by calculating a dissimilarity value, for each set of security-related events, that indicates a uniqueness of the set of security-related events in relation to other sets of security-related events using a dissimilarity function and adjusting the dissimilarity function based on a homogeneity of clusters of sets of security-related events, (iv) determine, based on clustering the sets of security-related events by the dissimilarity value, that a set of security-related events comprises an anomaly, and (v) perform a security action in response to determining that the set of security-related events comprises the anomaly.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
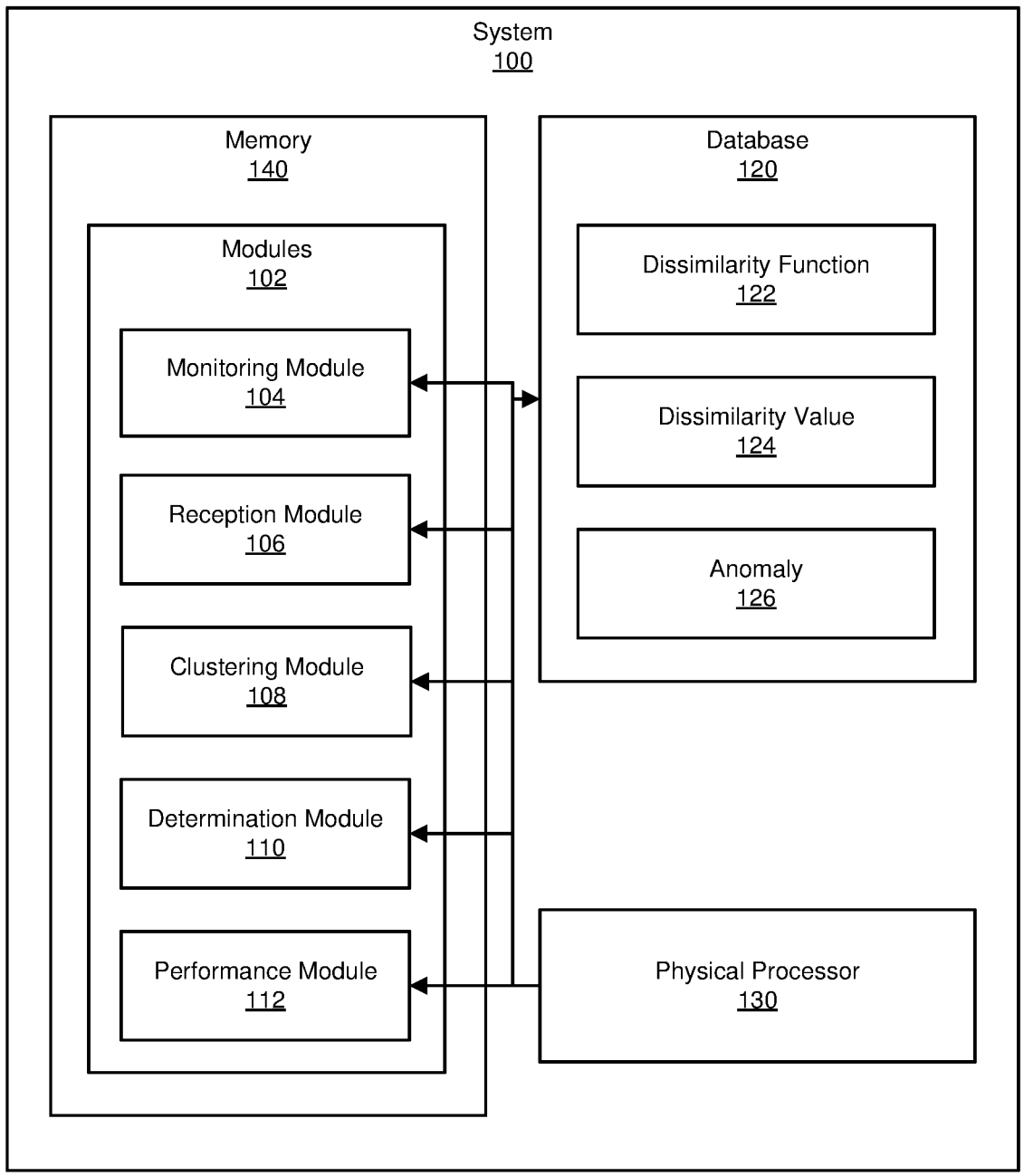
FIG. 1 is a block diagram of an example system for managing computer security of client computing machines.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing computer security of client computing machines. As will be explained in greater detail below, by clustering sets of security-related events, or security incidents, the systems and methods described herein may more easily identify anomalous incidents that indicate emerging security issues than traditional classification methods. For example, by weighting events using a dissimilarity function, the disclosed systems and methods may create clusters of incidents that are distinctly different from other types of incidents. Furthermore, by intuitively grouping incidents into similar clusters, the disclosed systems and methods may provide clients with a better overview of the security of their devices.

In addition, the systems and methods described herein may improve the functioning of a computing device by improving detection of anomalous incidents and remediating these incidents. These systems and methods may also improve the field of MSS and/or network security by tailoring classification of events and incidents based on available data and providing the tailored classification to clients.

Figure 2:
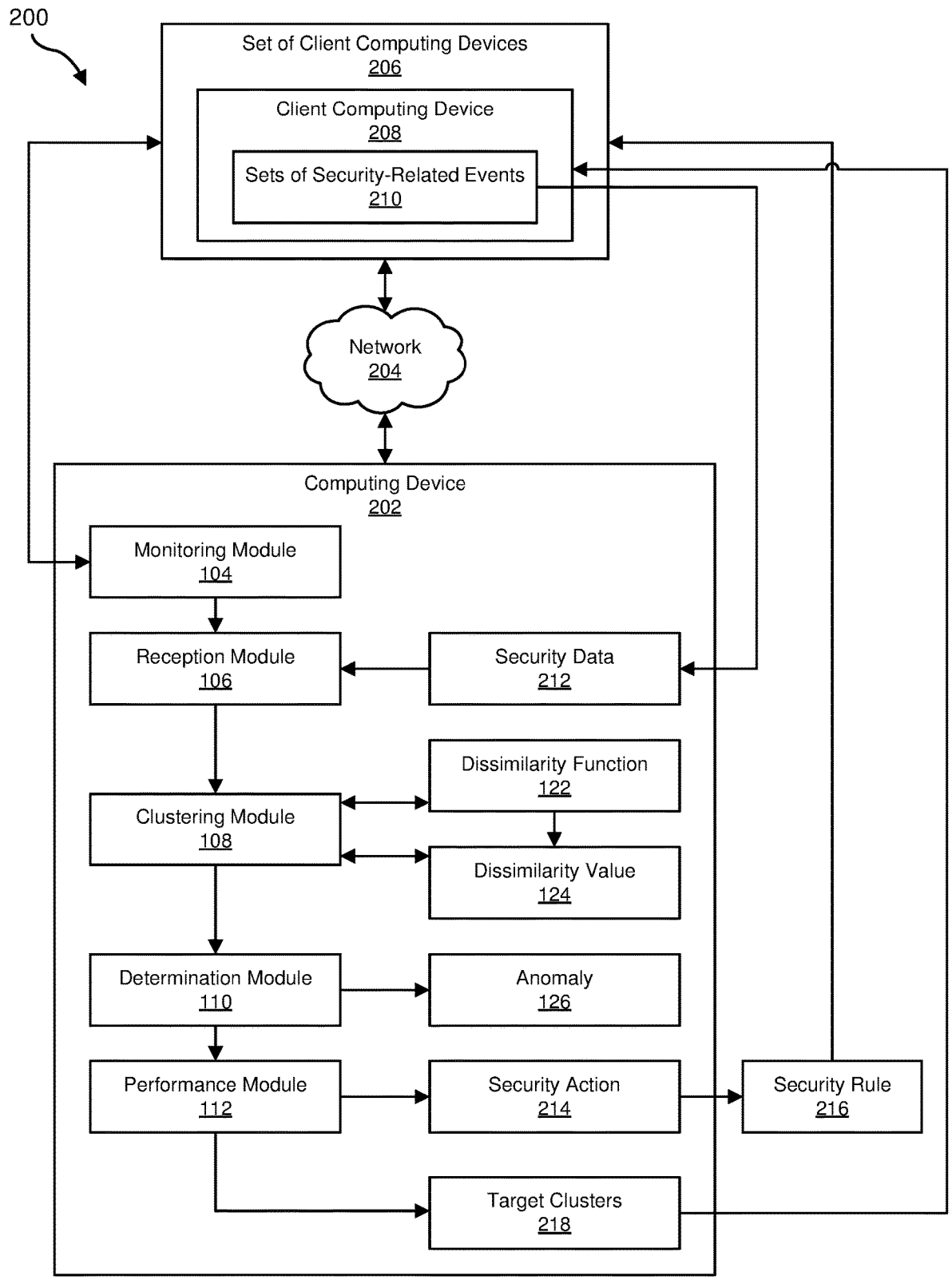
FIG. 2 is a block diagram of an additional example system for managing computer security of client computing machines.

The following will provide, with reference to FIGS. 1 and 2, detailed descriptions of example systems for managing computer security of client computing machines. Detailed descriptions of corresponding computer-implemented methods will also be provided in connection with FIG. 3. In addition, detailed descriptions of example clusters of example sets of security-related events will be provided in connection with FIG. 4. Furthermore, detailed descriptions of an example computing system and network architecture capable of implementing one or more of the embodiments described herein will be provided in connection with FIGS. 5 and 6, respectively.

FIG. 1 is a block diagram of example system 100 for managing computer security of client computing machines. As illustrated in this figure, example system 100 may include one or more modules 102 for performing one or more tasks. For example, and as will be explained in greater detail below, modules 102 may include a monitoring module 104 that monitors a set of client computing devices. Modules 102 may additionally include a reception module 106 that receives, by a computing device, security data on sets of security-related events from each client computing device in the set of client computing devices. The term "security-related event," as used herein, generally refers to an occurrence or action caused by a computing system and/or a user that relates to the security of the computing system.

Modules 102 may further include a clustering module 108 that clusters the sets of security-related events by calculating a dissimilarity value, for each set of security-related events, that indicates a uniqueness of the set of security-related events in relation to other sets of security-related events using a dissimilarity function and adjusting the dissimilarity function based on a homogeneity of clusters of sets of security-related events. As used herein the term "clustering" generally refers to a process of analyzing and grouping related objects, or sets of security-related events, based on similar attributes. The term "dissimilarity function," as used herein, generally refers to an algorithm that calculates a numerical value, or dissimilarity value, of how different two or more objects are. Examples of dissimilarity functions include, without limitation, a distance metric, a dissimilarity matrix, a Jaccard distance function, a Euclidean distance function, the inverse of a similarity function, variations or combinations of one or more of the same, and/or any other suitable algorithm.

Modules 102 may also include a determination module 110 that determines, based on clustering the sets of security-related events by the dissimilarity value, that a set of security-related events comprises an anomaly. The term "anomaly," as used herein, generally refers to an event or a set of events that are unusual or otherwise notably different from normal events occurring on a computing device. Furthermore, modules 102 may include a performance module 112 that performs a security action in response to determining that the set of security-related events comprises the anomaly. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or client computing device 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing computer security of client computing machines. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a dissimilarity function 122, which may include an algorithm for calculating a distance between sets of security-related events, and/or a dissimilarity value 124, which may include the distance between a set of security-related events and at least one other set of security-related events. Database 120 may also be configured to store an anomaly 126, which may include a set or sets of security-related events that significantly differ from other sets of security-related events. Database 120 may represent portions of a single database or computing device or a plurality of databases or computing devices. For example, database 120 may represent a portion of computing device 202 and/or client computing device 208 in FIG. 2. Alternatively, database 120 in FIG. 1 may represent one or more physically separate devices capable of being accessed by a computing device, such as computing device 202 and/or client computing device 208 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a set of client computing devices 206 via a network 204. In one example, all or a portion of the functionality of modules 102 may be performed by computing device 202, client computing device 208, and/or any other suitable computing system.

As will be described in greater detail below, one or more of modules 102 from FIG. 1 may, when executed by at least one processor of computing device 202, enable computing device 202 to monitor network security for client computing devices. For example, and as will be described in greater detail below, monitoring module 104 may monitor set of client computing devices 206. Reception module 106 may receive, by computing device 202, security data 212 on sets of security-related events 210 from each client computing device 208 in set of client computing devices 206. Clustering module 108 may cluster sets of security-related events 210 by calculating dissimilarity value 124, for each set of security-related events, that indicates a uniqueness of the set of security-related events in relation to other sets of security-related events using dissimilarity function 122 and adjusting dissimilarity function 122 based on a homogeneity of clusters of sets of security-related events. Determination module 110 may determine, based on clustering sets of security-related events 210 by dissimilarity value 124, that a set of security-related events comprises anomaly 126. Performance module 112 may perform a security action 214 in response to determining that the set of security-related events comprises anomaly 126.

In the example of FIG. 2, and as will be explained in greater detail below, computing device 202 may first monitor set of client computing devices 206 via network 204. Computing device 202 may then receive security data 212 about sets of security-related events 210 from client computing device 208 via network 204. Next, computing device 202 may cluster sets of security-related events 210 using dissimilarity function 122 to calculate dissimilarity value 124 for each set of security-related events. Computing device 202 may also adjust dissimilarity function 122 using various attributes to ensure proper clustering. Computing device 202 may additionally determine that a set of security-related events comprises anomaly 126 using the adjusted dissimilarity function 122. Finally, computing device 202 may perform security action 214 to create a security rule 216 for anomaly 126 and apply security rule 216 to set of client computing devices 206. As shown in FIG. 2, computing device 202 may further identify target clusters 218 of sets of security-related events to send to client computing device 208 for additional review.

Computing device 202 and/or client computing device 208 generally represent any type or form of computing device capable of reading computer-executable instructions. For example, computing device 202 may represent an MSS provider machine running network security software and client computing device 208 may represent a networked endpoint device capable of tracking security-related events. Additional examples of computing device 202 and/or a client computing device include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Network 204 generally represents any medium or architecture capable of facilitating communication or data transfer. In one example, network 204 may facilitate communication between computing device 202 and set of client computing devices 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
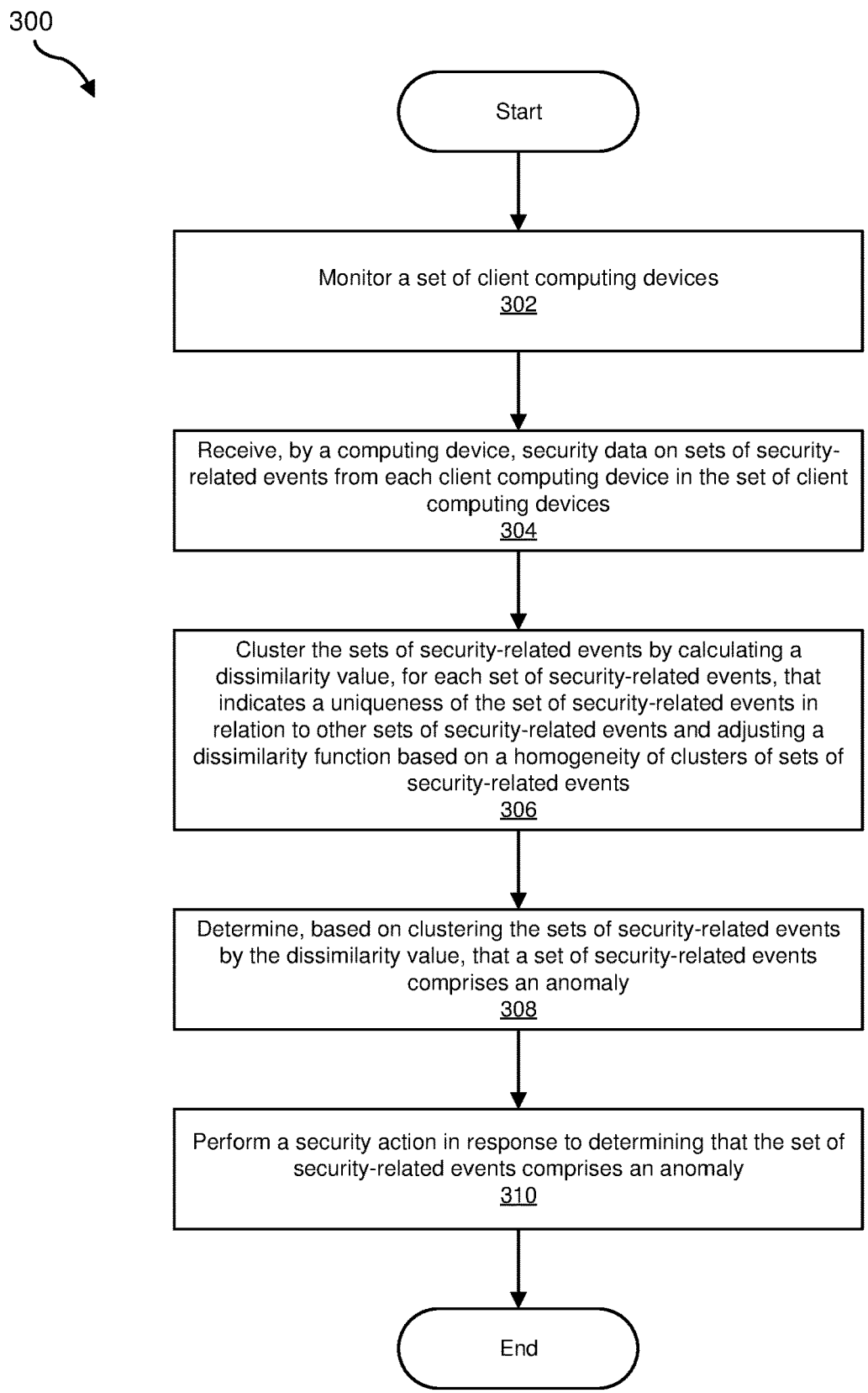
FIG. 3 is a flow diagram of an example method for managing computer security of client computing machines.

FIG. 3 is a flow diagram of an example computer-implemented method 300 for managing computer security of client computing machines. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may monitor a set of client computing devices. For example, monitoring module 104 may, as part of computing device 202 in FIG. 2, monitor set of client computing devices 206.

Monitoring module 104 may monitor set of client computing devices 206 in a variety of ways. In some embodiments, each client computing device within set of client computing devices 206, such as client computing device 208, may monitor its own activity and identify security-related events. Additionally or alternatively, client computing device 208 may monitor other computing devices within a local network and/or organization. Monitoring module 104 may then monitor client computing device 208 to obtain data about client computing device 208 and/or other computing devices. Furthermore, although shown as a single device in FIG. 2, client computing device 208 may represent a group of devices based on a common network and/or organization. For example, client computing device 208 may represent endpoint devices for an enterprise, and set of client computing devices 206 may represent endpoint devices for multiple enterprises.

Returning to FIG. 3, at step 304, one or more of the systems described herein may receive, by a computing device, security data on sets of security-related events from each client computing device in the set of client computing devices. For example, reception module 106 may, as part of computing device 202 in FIG. 2, receive security data 212 on sets of security-related events 210 from each client computing device 208 in set of client computing devices 206.

Reception module 106 may receive security data 212 in a variety of ways. In the above example, reception module 106 may receive security data 212 from client computing device 208 about all endpoint devices in the same enterprise or local network together as a whole. Additionally or alternatively, reception module 106 may receive security data 212 about each client computing device separately.

Security data 212 may include various information about client computing device 208 and/or other devices. In one embodiment, security data 212 may include a malware report, a vulnerability scan, a report of an attack, a report of an attempted attack, and/or data on a response to a security-related event. The term "malware," as used herein, generally refers to malicious software designed to disrupt the functions of computing devices and/or collect sensitive data. In some examples, malware may install itself in software programs, on operating systems or firmware, and/or directly to the read only memory of computing devices. Examples of malware include, without limitation, viruses, Trojans, spyware, worms, rootkits, variations of one or more of the same, variations or combinations of one or more of the same, or any other form of malicious executable code. The term "vulnerability scan," as used herein, generally refers to an assessment of the security and vulnerabilities to attack of a computing system. In this embodiment, a report of malware and/or an attack may include information about an origin of the attack, an effect of the attack, a result of the attack, or other security-related information. Furthermore, a response to a security-related event may include information about a system or user response to the security-related event and/or an effect on the system or user.

In one example, sets of security-related events 210 may include security-related events grouped by a timing of occurrence. In this example, client computing device 208 may group security-related events based on when they occur and on which client computing device the security-related events occur. For example, client computing device 208 may group all security-related events occurring within the span of a day on a particular endpoint device into a single set of security-related events. Each set within sets of security-related events 210 may then represent a group of security-related events occurring in close temporal proximity on a single device. In alternate examples, each set within sets of security-related events 210 may be grouped by temporal proximity for client computing devices within a local network or organization.

Returning to FIG. 3, at step 306, one or more of the systems described herein may cluster the sets of security-related events by calculating a dissimilarity value, for each set of security-related events, that indicates a uniqueness of the set of security-related events in relation to other sets of security-related events using a dissimilarity function and adjusting the dissimilarity function based on a homogeneity of clusters of sets of security-related events. For example, clustering module 108 may, as part of computing device 202 in FIG. 2, cluster sets of security-related events 210 by calculating dissimilarity value 124, for each set of security-related events, that indicates a uniqueness of the set of security-related events in relation to other sets of security-related events using dissimilarity function 122 and adjusting dissimilarity function 122 based on a homogeneity of clusters of sets of security-related events.

Clustering module 108 may cluster sets of security-related events 210 in a variety of ways. In some embodiments, clustering module 108 may calculate dissimilarity value 124 by weighting each security-related event based on an attribute of the security-related event and calculating a total value for the set of security-related events. In these embodiments, the attribute of the security-related event may include an inverse of a frequency of the security-related event in security data 212, a response to the security-related event, a type of the security-related event, a timing of the security-related event, and/or a description of the security-related event. For example, clustering module 108 may weight security-related events using a term frequency-inverse document frequency (TF-IDF) method such that a frequency of a security-related event within a set of security-related events is counterbalanced by the frequency of the security-related event across all sets of security-related events. In this example, a security-related event that frequently occurs on multiple client computing devices may be less important to clustering using dissimilarity function 122 than another security-related event that rarely occurs, and therefore may be more unique in security data 212. As another example, security-related events may be weighted based on uniqueness of textual descriptions of the security-related events, as determined by a text analysis of the descriptions.

In some examples, clustering module 108 may calculate dissimilarity value 124 using dissimilarity function 122. Dissimilarity function 122 may be determined based on available data within security data 212. For example, with sparse data, a Jaccard distance may be calculated for a set of security-related events based on a number of common security-related events in the set of security-related events with other sets of security-related events in security data 212. In other examples, dissimilarity function 122 may be determined using predefined metrics or attributes. Dissimilarity function 122 may generally represent any arbitrary function capable of distinguishing between security-related events and/or sets of security-related events. Furthermore, dissimilarity function 122 may be scalable to fit smaller or larger datasets, dependent on the size of security data 212.

In some embodiments, clustering module 108 may adjust dissimilarity function 122 by revising an algorithm to calculate dissimilarity value 124 of the set of security-related events such that the set of security-related events is more homogeneous with its cluster than with other clusters. Inversely, clustering module 108 may adjust dissimilarity function 122 such that clusters of sets of security-related events are more heterogeneous. In these embodiments, clustering module 108 may also revise the algorithm based on an attribute of security-related events used in the original algorithm or an attribute not originally used. For example, the fit of the algorithm may be tested by comparing responses to security-related events between clusters of sets of security-related events. In this example, the algorithm may be adjusted so that responses to security-related events within a cluster are more uniform. Other methods of adjusting the algorithm may alternatively be implemented in order to ensure dissimilarity function 122 clusters sets of security-related events 210 to show different groups of security incidents.

In some examples, clustering module 108 may adjust dissimilarity function 122 such that sets of security-related events are clustered at various levels of granularity. For example, clusters may represent sets of security-related events occurring on a single machine or in an organization. Clusters may also represent various levels of granularity of security incidents, such as smaller individual incidents within a day or larger incidents across longer time periods. A level of granularity may be determined based on the homogeneity of clusters as well as the attribute of security-related events, such as responses to security-related events.

Figure 4:
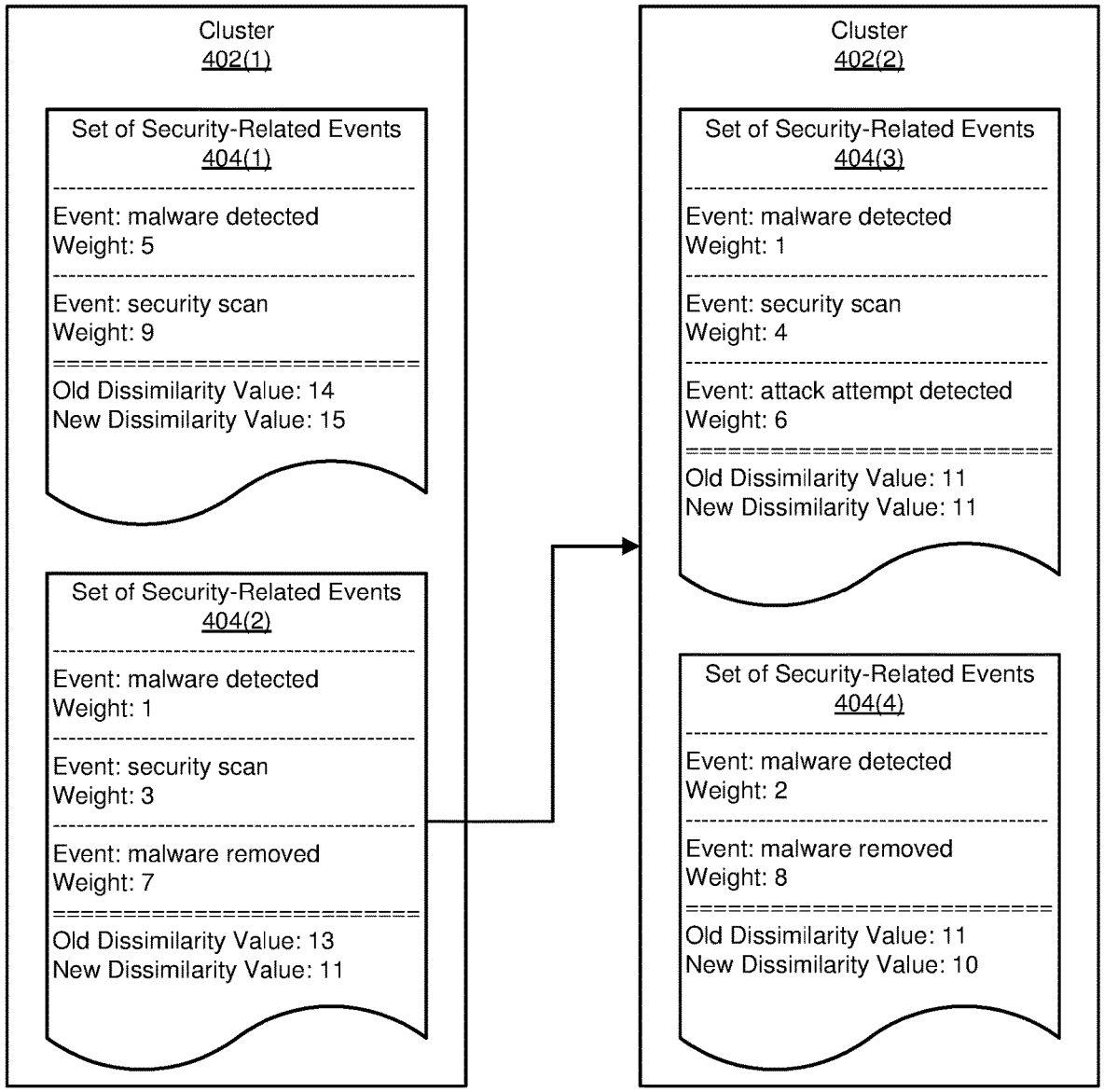
FIG. 4 is a block diagram of example clusters of example sets of security-related events.

As illustrated in FIG. 4, sets of security-related events 404(1), 404(2), 404(3), and 404(4) include security data on types of events. Clustering module 108 may weight each type of event within a set of security-related events and calculate a total dissimilarity value for the set of security-related events based on the weighting (e.g., "old dissimilarity value"). Clustering module 108 may then adjust a cluster 402(1), containing set of security-related events 404(1) and set of security-related events 404(2), and a cluster 402(2), containing set of security-related events 404(3) and set of security-related events 404(4), based on the exact types of security-related events in each set. In this example, set of security-related events 404(2) may be moved from cluster 402(1) to cluster 402(2) based on the adjusted dissimilarity values (e.g., "new dissimilarity value").

Returning to FIG. 3, at step 308, one or more of the systems described herein may determine, based on clustering the sets of security-related events by the dissimilarity value, that a set of security-related events comprises an anomaly. For example, determination module 110 may, as part of computing device 202 in FIG. 2, determine, based on clustering sets of security-related events 210 by dissimilarity value 124, that a set of security-related events comprises anomaly 126.

Determination module 110 may determine that a set of security-related events comprises anomaly 126 in a variety of ways. In one example, determination module 110 may determine that the set of security-related events does not fit in a cluster and/or comprises its own cluster. Additionally or alternatively, determination module 110 may determine that a cluster of sets of security-related events does not fall under predefined types of security-related events and/or security incidents and, therefore, represents a new type of security incident. In this example, clusters may represent classifications of security events or incidents, and an unusual or unique cluster may represent a new classification. In the example of FIG. 4, set of security-related events 404(1) may comprise the entirety of cluster 402(1) after adjusting the dissimilarity values. In this example, determination module 110 may determine that set of security-related events 404(1) comprises anomaly 126 due to a high dissimilarity value. In other examples, determination module 110 may determine a set of security-related events within a cluster of security-related events comprises anomaly 126 due to specific attributes of the security-related events.

Returning to FIG. 3, at step 310, one or more of the systems described herein may perform a security action in response to determining that the set of security-related events comprises the anomaly. For example, performance module 112 may, as part of computing device 202 in FIG. 2, perform security action 214 in response to determining that the set of security-related events comprises anomaly 126.

Performance module 112 may perform security action 214 in a variety of ways. In one embodiment, performance module 112 may perform security action 214 by creating new security rule 216 for anomaly 126, alerting an administrator about anomaly 126, and/or alerting a client user about anomaly 126. The term "security rule," as used herein, generally refers to a rule or standard that defines and/or manages digital security for a computing system. In the example of FIG. 2, performance module 112 may apply new security rule 216 for anomaly 126 to set of client computing devices 206. For example, security rule 216 may block security-related events caused by a new type of malware identified by anomaly 126. Performance module 112 may then ensure that security rule 216 is enforced for client computing device 208. In another example, performance module 112 may alert an administrator of an MSS provider about anomaly 126 for further review. The administrator may identify the new type of malware and create security rule 216. Alternatively, performance module 112 may alert a client user about anomaly 126 so that the client user may identify unusual behavior on an endpoint device.

In one example, the systems described herein may further include determining that other sets of security-related events within a cluster of anomaly 126 is anomalous. The systems described herein may then perform security action 214 on the other sets of security-related events. For example, in the example of FIG. 4, if set of security-related events 404(3) is determined to be anomaly 126, all sets of security-related events within cluster 402(2) may be determined to be anomalous. Thus, the systems described herein may perform security action 214 on both set of security-related events 404(3) and set of security-related events 404(4). In other examples, an administrator may perform security action 214 on a cluster of a coarser or finer granularity than cluster 402(2) in order to include all anomalous sets of security-related events that may include the same security incident as anomaly 126.

In some examples, the systems described herein may further include extracting target clusters of sets of security-related events, such as target clusters 218, for a target client computing device, such as client computing device 208. The systems described herein may then send target clusters 218 to client computing device 208. In these examples, target clusters 218 may include sets of security-related events 210 that correspond to events occurring on client computing device 208. Additionally or alternatively, target clusters 218 may include other sets of security-related events that occur on devices similar to client computing device 208 and/or devices within the same local network or organization.

A client user of client computing device 208 may then use target clusters 218 for analysis on a behavior or security-related event of client computing device 208. For example, the client user may use data on target clusters 218 for trend analysis to identify changes in behaviors of endpoint devices over a time period. Target cluster 218 may also be presented intuitively to group similar security-related events and/or security incidents for each client computing device or group of devices.

As explained above in connection with method 300 in FIG. 3, the disclosed systems and methods may, by clustering sets of security-related events rather than evaluating events themselves, improve MSS solutions for client computing devices. Specifically, the disclosed systems and methods may monitor client devices and collect data on sets of events grouped by timing. By also collecting data on various attributes of events, the systems and methods described herein may weight individual events by one or more attributes in order to normalize the data, such as by giving rare events more weight.

Using a dissimilarity function to cluster the sets of security-related events, the disclosed systems and methods may then use the resulting clusters as classifications for security-related behaviors. By identifying an anomalous cluster, the systems and methods described herein may identify potentially new security incidents and create new security rules to apply to the new incidents. Furthermore, the systems and methods described herein may present security data in a more intuitive format to clients by portraying clusters of incidents and showing trends of behaviors on client devices.

As detailed above, by performing clustering at a higher level of granularity on sets of security-related events, the disclosed systems and methods may more easily identify trends in overall security behaviors of client machines. In addition, by weighting individual security-related events using a dissimilarity function, the disclosed systems and methods may identify anomalous sets of security-related events and create new classifications through clustering. Furthermore, by enabling an arbitrary dissimilarity function to be adjusted, the disclosed systems and methods may cluster various types of security data. Thus, the systems and methods described herein may improve the management and monitoring of client device security such as MSS.

Figure 5:
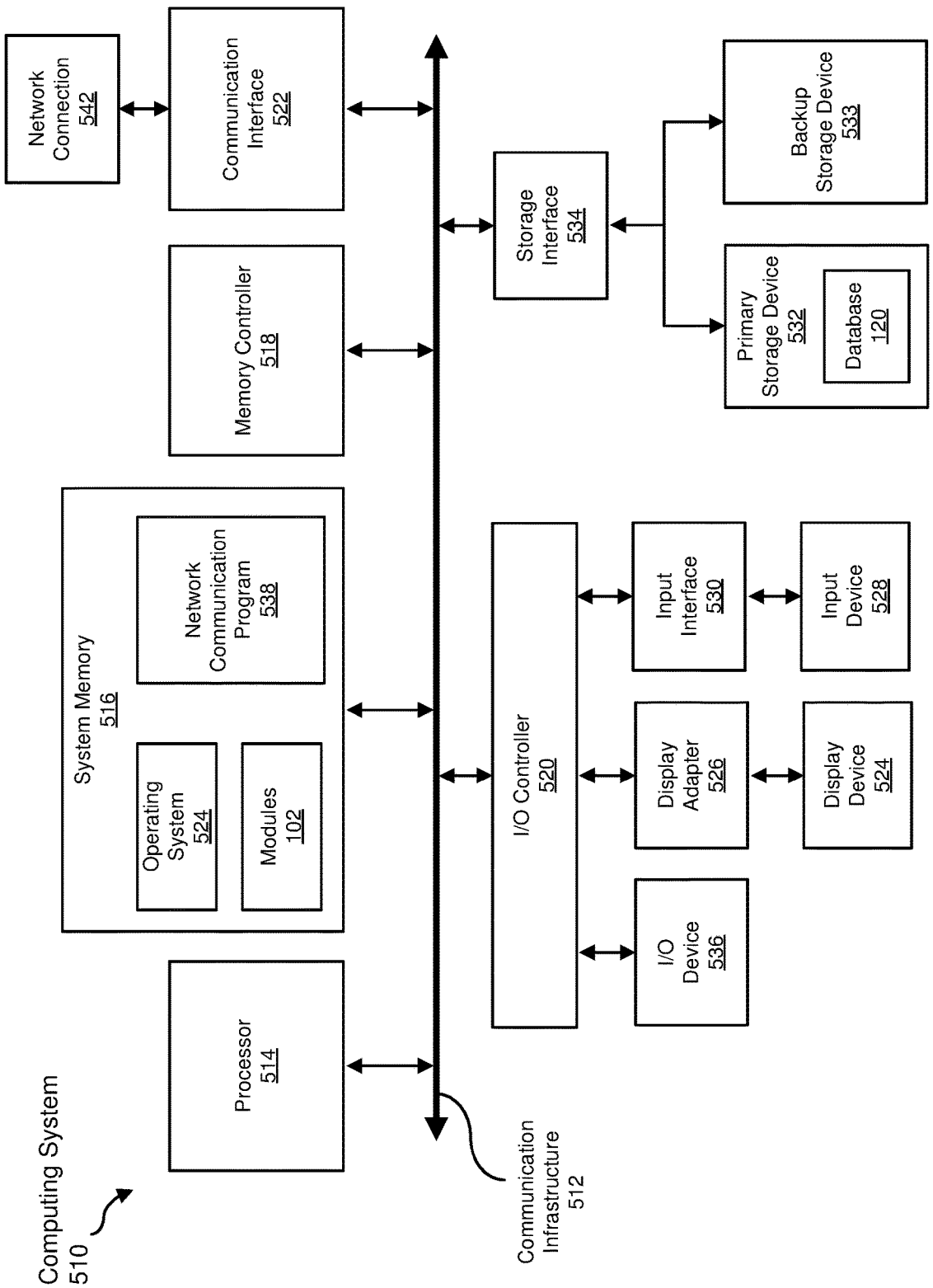
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application-Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an ASIC adapted to implement one or more of the example embodiments disclosed herein.

Figure 6:
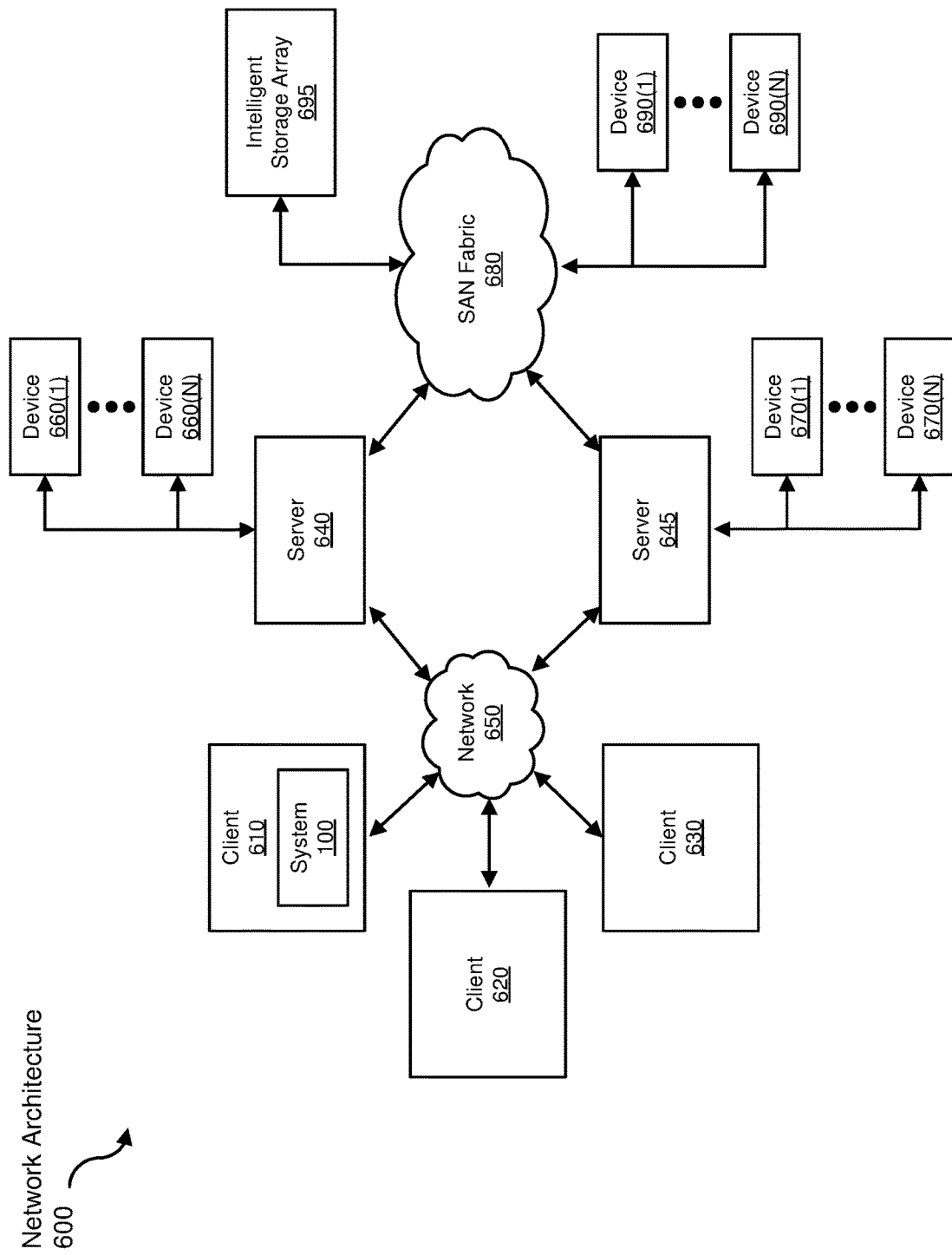
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for managing computer security of client computing machines.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive security data to be transformed, transform the security data, output a result of the transformation to a storage or output device, use the result of the transformation to cluster sets of security-related events, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing computer security of client computing machines, at least a portion of the method being performed by a computing device comprising at least one processor, the method comprising:
   monitoring a set of client computing devices;
   receiving, by the computing device, security data on sets of security-related events from each client computing device in the set of client computing devices, wherein each set of security-related events comprises a set of computing actions that relate to a security incident on at least one client computing device in the set of client computing devices;
   clustering the sets of security-related events by:
      calculating a dissimilarity value, for each set of security-related events, that indicates a uniqueness of the set of security-related events in relation to other sets of security-related events using a dissimilarity function, wherein the dissimilarity function calculates the difference between at least two sets of security-related events;
      creating at least one cluster by grouping sets of security-related events that have similar dissimilarity values, wherein a cluster comprises a classification of security-related behaviors;
      adjusting the dissimilarity function based on a homogeneity of clusters of sets of security-related events; and
      adjusting at least one cluster based on the adjusted dissimilarity function;
   determining, based on clustering the sets of security-related events by the dissimilarity value, that a set of security-related events comprises an anomaly based on the classification of the cluster of the set of security-related events as an anomalous cluster; and
   performing a security action, in response to determining that the set of security-related events comprises the anomaly, to enforce a security rule for the set of client computing devices.

2. The method of claim 1, wherein the security data comprises at least one of:
   a malware report;
   a vulnerability scan;
   a report of an attack;
   a report of an attempted attack; and
   data on a response to a security-related event.

3. The method of claim 1, wherein the sets of security-related events comprise security-related events grouped by a timing of occurrence.

4. The method of claim 1, wherein calculating the dissimilarity value comprises:
   weighting each security-related event based on an attribute of the security-related event; and
   calculating a total value for the set of security-related events.

5. The method of claim 4, wherein the attribute of the security-related event comprises at least one of:
   an inverse of a frequency of the security-related event in the security data;
   a response to the security-related event;
   a type of the security-related event;
   a timing of the security-related event; and
   a description of the security-related event.

6. The method of claim 1, wherein adjusting the dissimilarity function comprises revising an algorithm to calculate the dissimilarity value of the set of security-related events such that the set of security-related events is more homogeneous with its cluster than with other clusters.

7. The method of claim 1, wherein performing the security action comprises at least one of:
   creating at least one new security rule for the anomaly;
   alerting an administrator about the anomaly; and
   alerting a client user about the anomaly.

8. The method of claim 1, further comprising:
   determining that other sets of security-related events within the cluster of the anomaly are anomalous; and
   performing the security action on the other sets of security-related events.

9. The method of claim 1, further comprising:
   extracting target clusters of sets of security-related events for a target client computing device; and
   sending the target clusters to the target client computing device.

10. A system for managing computer security of client computing machines, the system comprising:
   a monitoring module, stored in memory, that monitors a set of client computing devices;
   a reception module, stored in memory, that receives, by a computing device, security data on sets of security-related events from each client computing device in the set of client computing devices, wherein each set of security-related events comprises a set of computing actions that relate to a security incident on at least one client computing device in the set of client computing devices;
   a clustering module, stored in memory, that clusters the sets of security-related events by:
      calculating a dissimilarity value, for each set of security-related events, that indicates a uniqueness of the set of security-related events in relation to other sets of security-related events using a dissimilarity function, wherein the dissimilarity function calculates the difference between at least two sets of security-related events;
      creating at least one cluster by grouping sets of security-related events that have similar dissimilarity values, wherein a cluster comprises a classification of security-related behaviors;
adjusting the dissimilarity function based on a homogeneity of clusters of sets of security-related events; and
adjusting at least one cluster based on the adjusted dissimilarity function;
a determination module, stored in memory, that determines, based on clustering the sets of security-related events by the dissimilarity value, that a set of security-related events comprises an anomaly based on the classification of the cluster of the set of security-related events as an anomalous cluster;
a performance module, stored in memory, that performs a security action, in response to determining that the set of security-related events comprises the anomaly, to enforce a security rule for the set of client computing devices; and
at least one hardware processor that executes the monitoring module, the reception module, the clustering module, the determination module, and the performance module.

11. The system of claim 10, wherein the security data comprises at least one of:
a malware report;
a vulnerability scan;
a report of an attack;
a report of an attempted attack; and
data on a response to a security-related event.

12. The system of claim 10, wherein the sets of security-related events comprise security-related events grouped by a timing of occurrence.

13. The system of claim 10, wherein the clustering module calculates the dissimilarity value by:
weighting each security-related event based on an attribute of the security-related event; and
calculating a total value for the set of security-related events.

14. The system of claim 13, wherein the attribute of the security-related event comprises at least one of:
an inverse of a frequency of the security-related event in the security data;
a response to the security-related event;
a type of the security-related event;
a timing of the security-related event; and
a description of the security-related event.

15. The system of claim 10, wherein the clustering module adjusts the dissimilarity function by revising an algorithm to calculate the dissimilarity value of the set of security-related events such that the set of security-related events is more homogeneous with its cluster than with other clusters.

16. The system of claim 10, wherein the performance module performs the security action by at least one of:
creating at least one new security rule for the anomaly;
alerting an administrator about the anomaly; and
alerting a client user about the anomaly.

17. The system of claim 10, further comprising:
determining that other sets of security-related events within the cluster of the anomaly are anomalous; and
performing the security action on the other sets of security-related events.

18. The system of claim 10, further comprising:
extracting target clusters of sets of security-related events for a target client computing device; and
sending the target clusters to the target client computing device.

19. A non-transitory computer-readable medium comprising one or more computer-executable instructions that, when executed by at least one processor of a computing device, cause the computing device to:
monitor a set of client computing devices;
receive, by the computing device, security data on sets of security-related events from each client computing device in the set of client computing devices, wherein each set of security-related events comprises a set of computing actions that relate to a security incident on at least one client computing device in the set of client computing devices;
cluster the sets of security-related events by:
calculating a dissimilarity value, for each set of security-related events, that indicates a uniqueness of the set of security-related events in relation to other sets of security-related events using a dissimilarity function, wherein the dissimilarity function calculates the difference between at least two sets of security-related events;
creating at least one cluster by grouping sets of security-related events that have similar dissimilarity values, wherein a cluster comprises a classification of security-related behaviors;
adjusting the dissimilarity function based on a homogeneity of clusters of sets of security-related events; and
adjusting at least one cluster based on the adjusted dissimilarity function;
determine, based on clustering the sets of security-related events by the dissimilarity value, that a set of security-related events comprises an anomaly based on the classification of the cluster of the set of security-related events as an anomalous cluster; and
perform a security action, in response to determining that the set of security-related events comprises the anomaly, to enforce a security rule for the set of client computing devices.

20. The non-transitory computer-readable medium of claim 19, wherein the security data comprises at least one of:
a malware report;
a vulnerability scan;
a report of an attack;
a report of an attempted attack; and
data on a response to a security-related event.

* * * * *